US009551491B2

(12) United States Patent
Eroglu et al.

(10) Patent No.: US 9,551,491 B2
(45) Date of Patent: Jan. 24, 2017

(54) METHOD FOR MIXING A DILUTION AIR IN A SEQUENTIAL COMBUSTION SYSTEM OF A GAS TURBINE

(71) Applicant: ALSTOM Technology Ltd, Baden (CH)

(72) Inventors: Adnan Eroglu, Untersiggenthal (CH); Ewald Freitag, Baden (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 704 days.

(21) Appl. No.: 13/974,611

(22) Filed: Aug. 23, 2013

(65) Prior Publication Data

US 2014/0053566 A1 Feb. 27, 2014

(30) Foreign Application Priority Data

Aug. 24, 2012 (EP) .................... 12181736

(51) Int. Cl.
*F02C 7/22* (2006.01)
*F23R 3/34* (2006.01)
(Continued)

(52) U.S. Cl.
CPC . *F23R 3/34* (2013.01); *F02C 7/22* (2013.01); *F02C 7/228* (2013.01); *F23R 3/06* (2013.01);
(Continued)

(58) Field of Classification Search
CPC ............... F02C 7/12; F02C 7/14; F02C 7/22; F02C 7/228; F23R 3/06; F23R 3/34; F23R 3/346; F23R 3/42; F23R 3/46; F23R 2900/03042; F23R 2900/03341
See application file for complete search history.

(56) References Cited

U.S. PATENT DOCUMENTS 4,030,875 A * 6/1977 Grondahl ............. F23C 3/00
                                                 60/753
5,628,182 A * 5/1997 Mowill ............... F02C 9/50
                                                 60/39.37
(Continued)

FOREIGN PATENT DOCUMENTS

CN    1056563 A    11/1991
CN    1116274 A     2/1996
(Continued)

*Primary Examiner* — Ehud Gartenberg
*Assistant Examiner* — Filippo Manfredi
(74) *Attorney, Agent, or Firm* — Buchanan Ingersoll & Rooney PC (57) ABSTRACT

The invention relates a method for mixing a dilution air with a hot main flow in a sequential combustion system of a gas turbine, wherein the gas turbine essentially comprises at least one compressor, a first combustor which is connected downstream to the compressor, and a second combustor. The hot gases of the first combustor are admitted to at least one intermediate turbine or directly or indirectly to at least one second combustor, wherein the hot gases of the second combustor are admitted to a further turbine or directly or indirectly to an energy recovery device. The method comprises a coaxial injection of first combustor liner cooling air with second combustor liner cooling air, the first combustor liner cooling air having a sufficient excess pressure margin with respect to the second combustor liner cooling air.

12 Claims, 7 Drawing Sheets

(51) Int. Cl.
*F23R 3/06* (2006.01)
*F23R 3/20* (2006.01)
*F02C 7/228* (2006.01)
*F23R 3/42* (2006.01)

(52) U.S. Cl.
CPC ............. *F23R 3/20* (2013.01); *F23R 3/346* (2013.01); *F23R 3/42* (2013.01); *F23R 2900/00014* (2013.01); *F23R 2900/03042* (2013.01); *F23R 2900/03341* (2013.01); *Y02E 20/14* (2013.01)

(56) References Cited

U.S. PATENT DOCUMENTS

| | | |
|---|---|---|
| 7,000,396 B1 | 2/2006 | Storey |
| 7,503,178 B2 | 3/2009 | Bucker et al. |
| 2012/0017601 A1 | 1/2012 | Eroglu et al. |

FOREIGN PATENT DOCUMENTS

| | | |
|---|---|---|
| CN | 1580520 A | 2/2005 |
| CN | 102192508 A | 9/2011 |
| DE | 196 31 616 | 2/1998 |
| DE | 103 12 971 | 12/2004 |
| EP | 0 321 809 | 6/1989 |
| EP | 0 620 362 | 10/1994 |
| EP | 0 646 704 | 4/1995 |
| EP | 0 646 705 | 4/1995 |
| EP | 0 964 740 | 1/1996 |
| EP | 0704657 | 4/1996 |
| EP | 0 718 470 | 6/1996 |
| EP | 0 704 657 | 10/1996 |
| EP | 2 385 303 | 11/2011 |
| JP | H08-219445 | 8/1996 |
| JP | 2010-159960 | 7/2010 |
| RU | 2171433 C1 | 7/2001 |
| RU | 2325588 C2 | 5/2008 |
| RU | 118029 U1 | 7/2012 |
| WO | 2006/053825 | 5/2006 |
| WO | 2009/041436 | 4/2009 |
| WO | 2011/061059 | 5/2011 |

\* cited by examiner

METHOD FOR MIXING A DILUTION AIR IN A SEQUENTIAL COMBUSTION SYSTEM OF A GAS TURBINE

CROSS-REFERENCE TO RELATED APPLICATIONS

This application claims priority to European Application 12181736.5 filed Aug. 24, 2012, the contents of which are hereby incorporated in its entirety.

TECHNICAL FIELD

The invention refers to a method for mixing dilution air in a sequential combustion system of a gas turbine. The invention refers additionally to a dilution air mixer for implementing the aforementioned method. Furthermore, the invention is related to mixing of dilution air with a hot main flow in a "CPSC" (Constant Pressure Sequential Combustion) for a can as well as annular combustor design in a reliable and uniform way at the lowest pressure drop possible. Furthermore, the invention refers to various premix burners for operating the combustors of a sequential combustion system of a gas turbine.

BACKGROUND

Beforehand, some general considerations which allow a better understanding of the invention:

CO emissions of gas turbine engines need reductions for the sake of saving the environment. Such emissions are known to appear, when there is not sufficient time in the combustion chamber to ensure the CO to $CO_2$ oxidation, and/or this oxidation is locally quenched due to contact with cold regions in the combustor. Since firing temperatures are smaller under part load conditions CO, and the CO to $CO_2$ oxidation gets slower, thus CO emissions usually tend to increase under these conditions.

A reduction of CO emissions in turn might be invested in lowering the gas turbine load at the parking point of a gas turbine. This reduces the environmental impact due to reduced $CO_2$ emissions and overall cost of electricity due to less fuel consumption during engine parking. Finally the CO emission reduction might be invested in a reduction of first costs due to savings on a CO catalyst. In this case a CO catalyst might be avoided (or at least reduced). At the same time losses, which appear due to a catalyst will be removed (or at least reduced), and thereby the overall efficiency of the power plant increased.

According to the US 2012/0017601 A1 the basic of this state of art is a method for operating the gas turbine, which keeps the air ratio $\lambda$ (defined in US 2012/0017601 A1 paragraph 0009) of the operating burner of the second combustor below a maximum air ratio $\lambda_{max}$ during part load operation. This method is characterized essentially by three new elements and also by supplementing measures which can be implemented individually or in combination.

The maximum air ratio $\lambda_{max}$ in this case depends upon the CO emission limits which are to be observed, upon the design of the burner and of the combustor, and also upon the operating conditions, that is to say especially the burner inlet temperature.

The first element is a change in the principle of operation of the row of variable compressor inlet guide vanes, which allows the second combustor to be put into operation only at higher part load. Starting from no-load operation, the row of variable compressor inlet guide vanes is already opened while only the first combustor is in operation. This allows loading up to a higher relative load before the second combustor has to be put in operation. If the row of variable compressor inlet guide vanes is opened and the hot gas temperature or turbine inlet temperature of the high-pressure turbine has reached a limit, the second combustor is supplied with fuel.

In addition, the row of variable compressor inlet guide vanes is quickly closed. Closing of the row of variable compressor inlet guide vanes at constant turbine inlet temperature TIT of the high-pressure turbine, without countermeasures, would lead to a significant reduction of the relative power.

In order to avoid this power reduction, the fuel mass flow, which is introduced into the second combustor, can be increased. The minimum load at which the second combustor is put into operation and the minimum fuel flow into the second combustor are therefore significantly increased.

As a result, the minimum hot gas temperature of the second combustor is also increased, which reduces the air ratio $\lambda$ and therefore reduces the CO emissions.

The second element for reducing the air ratio $\lambda$ is a change in the principle of operation by increasing the turbine exhaust temperature of the high-pressure turbine TAT1 and/or the turbine exhaust temperature of the low-pressure turbine TAT2 during part load operation. This increase allows opening of the row of variable compressor inlet guide vanes to be shifted to a higher load point.

Conventionally, the maximum turbine exhaust temperature of the second turbine is determined for the full load case and the gas turbine and possibly the downstream waste heat boiler are designed in accordance with this temperature. This leads to the maximum hot gas temperature of the second turbine not being limited by the TIT2 (turbine inlet temperature of the second turbine) during part load operation with the row of variable compressor inlet guide vanes closed, but by the TAT2 (turbine exhaust temperature of the second turbine). Since at part load with at least one row of variable compressor inlet guide vanes closed the mass flow and therefore the pressure ratio across the turbine is reduced, the ratio of turbine inlet temperature to turbine exhaust temperature is also reduced.

Correspondingly, with constant TAT2 the TIT2 is also reduced and in most cases lies considerably below the full load value. A proposed slight increase of the TAT2 beyond the full load limit, typically within the order of magnitude of 10° C. to 30° C., admittedly leads to an increase of the TIT2, but this remains below the full load value and can practically be achieved without service life losses, or without significant service life losses. Adaptations in the design or in the choice of material do not become necessary or can be limited typically to the exhaust gas side. For increasing the TIT2, the hot gas temperature is increased, which is realized by an increase of the fuel mass flow and a reduction of the air ratio $\lambda$, which is associated therewith. The CO emissions are correspondingly reduced.

A further possibility for reducing the air ratio $\lambda$ of the burner in operation is the deactivating of individual burners and redistribution of the fuel at constant TIT2.

In order to keep the TIT2 constant on average, the burner in operation has to be operated hotter in proportion to the number of deactivated burners. For this, the fuel feed is increased and therefore the local air ratio $\lambda$ is reduced.

For an operation which is optimized for CO emissions, in a gas turbine with split line, a burner (for example for the second combustor) which is adjacent to the split line is typically deactivated first of all. In this case, the plane in which a casing is typically split into upper and lower halves is referred to as the split line. The respective casing halves are connected in the split line by a flange, for example.

Its adjacent burners are subsequently then deactivated or a burner, which is adjacent to the parting plane on the opposite side of the combustor is deactivated and in alternating sequence the adjacent burners, which alternate on the two sides of the combustor, starting from the parting plane, are deactivated.

A burner which is adjacent to the split line is preferably deactivated first of all since the split line of a gas turbine is typically not absolutely leak proof and in most cases a leakage flow leads to a slight cooling and dilution (see below mentioned considerations) of the flammable gases and therefore to locally increased CO emissions. As a result of deactivating the burners which are adjacent to the split line, these local CO emissions are avoided.

The combustion instabilities which are to be avoided by means of staging, typically no longer occur at low load or are negligibly small. In one exemplary embodiment, it is proposed, therefore, to carry out the restricting not by means of a fixed restrictor but by means of at least one control valve. This at least one control valve is opened at low load so that all the activated burners can be operated virtually homogenously with a low air ratio λ. At high load, the at least one control valve is throttled in order to realize the staging.

Figures 2, 2A:
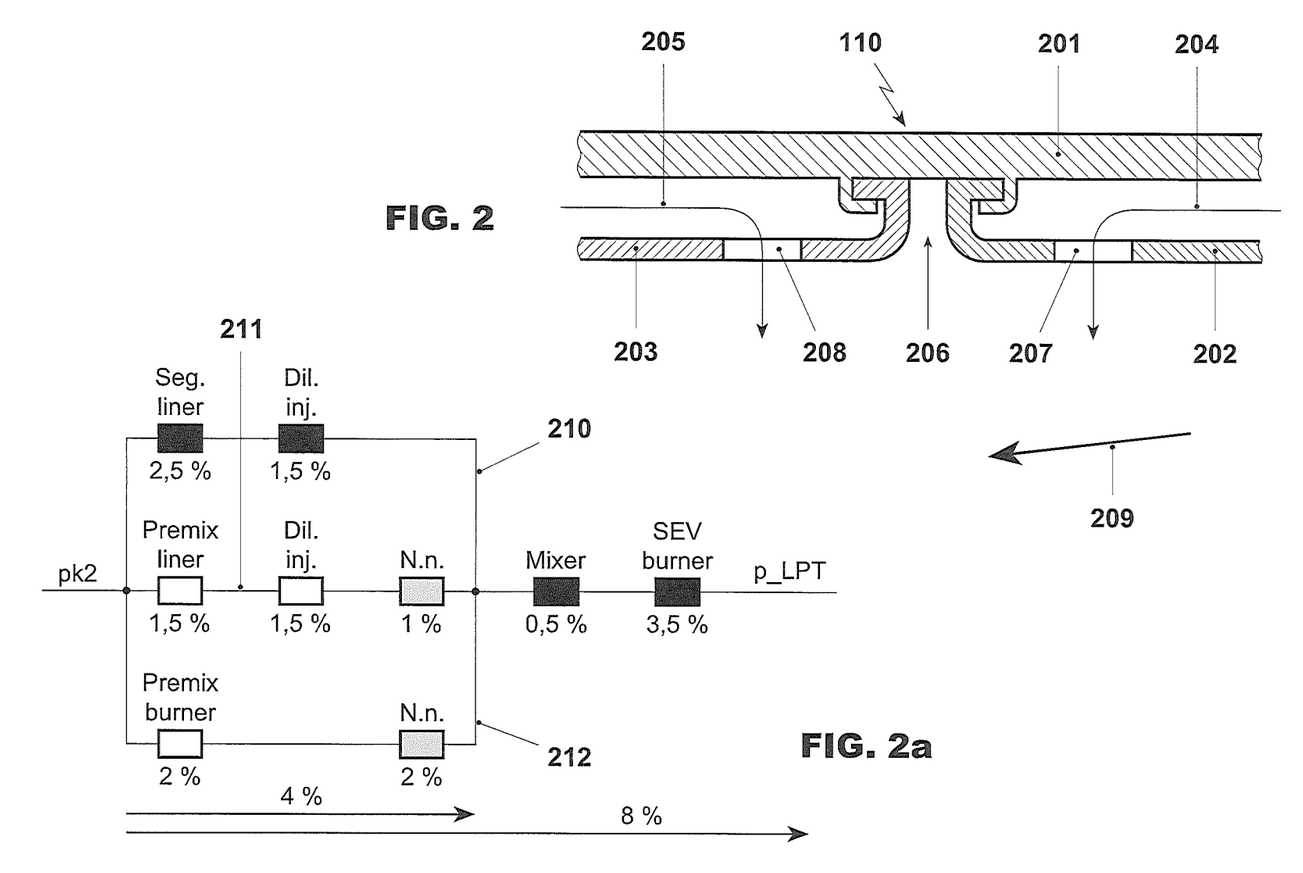
FIG. 2 shows a dilution air mixing geometry.
FIG. 2a shows a graphical scheme of the operational elements with details of the pressure drops.

Referring to the currently proceeding cooling air from the reheat (second) combustor and any remaining air from the premix (first) combustor or fresh air from plenum are supplied as dilution air to the combustor(s) separately, as shown in FIG. 2.

In order to have sufficient backflow margin, both dilution air streams have to be injected with an excess pressure of about 1.5%. But the problem is, that not all flow paths are at the same pressure level, due to different pressure drop characteristics of sequential and premix liner cooling as depicted in the FIG. 2a.

The configuration as shown in FIGS. 2/2a leads to at least 8% combustor pressure drop, as result of aforementioned backflow margin requirement and differences among all three flow paths. Pressure drop must be artificially increased in premix liner and premix burner circuits in order to match the sequential liner cooling circuit.

SUMMARY

The present invention is based on the object of proposing a method for operating a gas turbine with sequential combustion for a can as well as annular combustor design and is based on a co-axial injection of premix liner cooling air with sequential cooling air.

Additionally, the present invention is based on the concept of constant pressure sequential combustion system. In this concept, hot combustion products from premix combustor are cooled down by a dilution air mixer and subsequently enter a reheat combustor.

A dilution air mixer is responsible for mixing of premix and reheat cooling air with hot combustion products from the premix combustor. Primary requirements from this mixer are uniform temperature distribution at the inlet to the reheat burner, as well as low pressure drop for performance reasons.

The present invention is related to the mixing of dilution air with a hot main flow in a constant pressure sequential combustion system for a can as well as annular combustor designs in a reliable and uniform way at the lowest pressure drop possible.

The invention described below aims at a lower combustor pressure drop, additionally, at simple wall jets and uniform mixing, for gas turbines, which are using at least one combustor including an annular or a can-architecture with sequential combustion and including an operation under part load conditions. A generic sketch of such a gas turbine is shown for example in FIG. 1. Therein a compressor is followed by a combustor section, which can consist of a number of cans. Within these cans a first combustor is followed by a second combustor. Between these two combustors dilution air might be injected in order to control the inlet temperature of the second combustor and therefore the self-ignition time of the fuel injected therein. Finally, the hot combustion gases are fed into a turbine.

A can-architecture is also given, when an annular first and/or second combustion chamber having or comprising to each burner in flow direction an independent can or a separating flow combustion area which is wall-isolated from each other of the adjacent combustion areas or burners.

The basic idea of current invention is based on co-axial injection of premix liner cooling air with sequential liner cooling air. There could be advantageously multiple rows of holes with different diameters, in order to achieve optimum mixing.

This way, it is possible to have sufficient backflow margin even with sequential liner cooling air at 0.5% excess pressure, thanks to the shielding effect of external higher pressure from premix liner cooling.

Other advantageous concept consists of a dilution air mixer based on a co-axial dilution air injection with two rows, sleeves and an additional air support from plenum.

Other advantageous concept consists of a dilution air mixer based on a co-axial dilution air injection with additional air from plenum supporting sequential liner air.

Other advantageous concept consists of a dilution air mixer based on a co-axial dilution air injection with premix liner cooling air supporting sequential liner air.

Other advantageous concept consists of a dilution air mixer based on a co-axial dilution air injection with premix liner cooling air and plenum air supporting sequential liner air.

To ensure this final purpose it is also beneficially that the geometries and/or flow coefficients of the various components are measured and components with high flow rates and components with low flow rates are combined inside the combustor cans or annular combustion chamber.

The gas turbine comprises essentially at least one compressor a first combustor which is connected downstream to the compressor. The hot gases of the first combustor are admitted to at least one intermediate turbine or directly or indirectly to a second combustor. The hot gases of the second combustor are admitted to a further turbine or directly or indirectly to an energy recovery device, for example to a steam generator.

Advantages associated with the present invention are as follows:

Reduced total combustor pressure drop, thus increased thermodynamic efficiency.

Simple design of the dilution air mixer with wall jets.

Uniform temperature distribution at reheat burner inlet, thus a homogenous combustion process can act on the pulsations in the combustor and can act on an over-proportional increase of CO production of the reheat burner.

Reliable operation without local backflow or overheating.

Based on these findings the concept can be expected to work for an engine, which runs under sequential combustion (with or without a high pressure turbine) in a can-architecture, but not only.

Referring to a sequential combustion the combination of combustors can be disposed as follows:

At least one combustor is configured as a can-architecture, with at least one operating turbine.

Both, the first and second combustors are configured as sequential can-can architecture, with at least one operating turbine.

The first combustor is configured as an annular combustion chamber and the second combustor is built-on as a can configuration, with at least one operating turbine.

The first combustor is configured as a can-architecture and the second combustor is configured as an annular combustion chamber, with at least one operating turbine.

Both, the first and second combustor are configured as annular combustion chambers, with at least one operating turbine.

Both, the first and second combustor are configured as annular combustion chambers, with at least one intermediate operating turbine.

Accordingly, in terms of dilution air mixer for a can-architecture the interaction between individual cans is minimal or inexistent. Therefore for a can variant the described concept will be even more effective than for annular engine architecture.

In addition to the method, a gas turbine for implementing the method is a subject of the invention. Depending upon the concept of the dilution air mixer, the design of the gas turbine has to be adapted and/or the fuel distribution system and/or the cooling air system have to be adapted in order to ensure the feasibility depending on the used dilution air mixer for reducing the locally combustor pressure drop. All the components of a gas turbine lie within the range of permissible tolerances. These tolerances lead to slightly different geometries and characteristics for each component and for the used dilution air mixer.

This, especially, also leads to different pressure losses and flow rates during operation. The tolerances are selected so that they have practically no influence upon the operating behavior during normal operation, especially at high part load and full load. For this, the geometries and/or flow coefficients of the various dilution air mixers are measured with existing flow rates in connection with the dilution air mixer.

The further advantages associated with this invention are as follows:

CO emissions are reduced especially at lower part-load conditions. Therefore, the gas turbine can be parked at lower values during periods, where low power output being aspired by the power plant operator.

Thereby the power plant operator can save fuel and therefore reduce the overall cost of electricity.

Environmental benefit due to reduced CO emissions, lower parking point (thus less fuel consumption and $CO_2$ production) or a combination of both advantages.

Possibility of eliminating an expensive CO catalyst. Therefore first costs are reduced.

When using a setup including dilution air mixer between subsequent operating combustors further advantages arise:

Further CO reduction, with all advantages described above, due to increased volume for CO oxidation with origin in the first combustor.

Reduction of circumferential temperature gradients between the different can combustors. Therefore the turbine inlet profile is improved and lifetime of turbine parts is improved.

BRIEF DESCRIPTION OF THE DRAWINGS

The invention is shown schematically in FIGS. 1 to 7 based on exemplary embodiments.

In the drawings.

DETAILED DESCRIPTION

Figure 1:
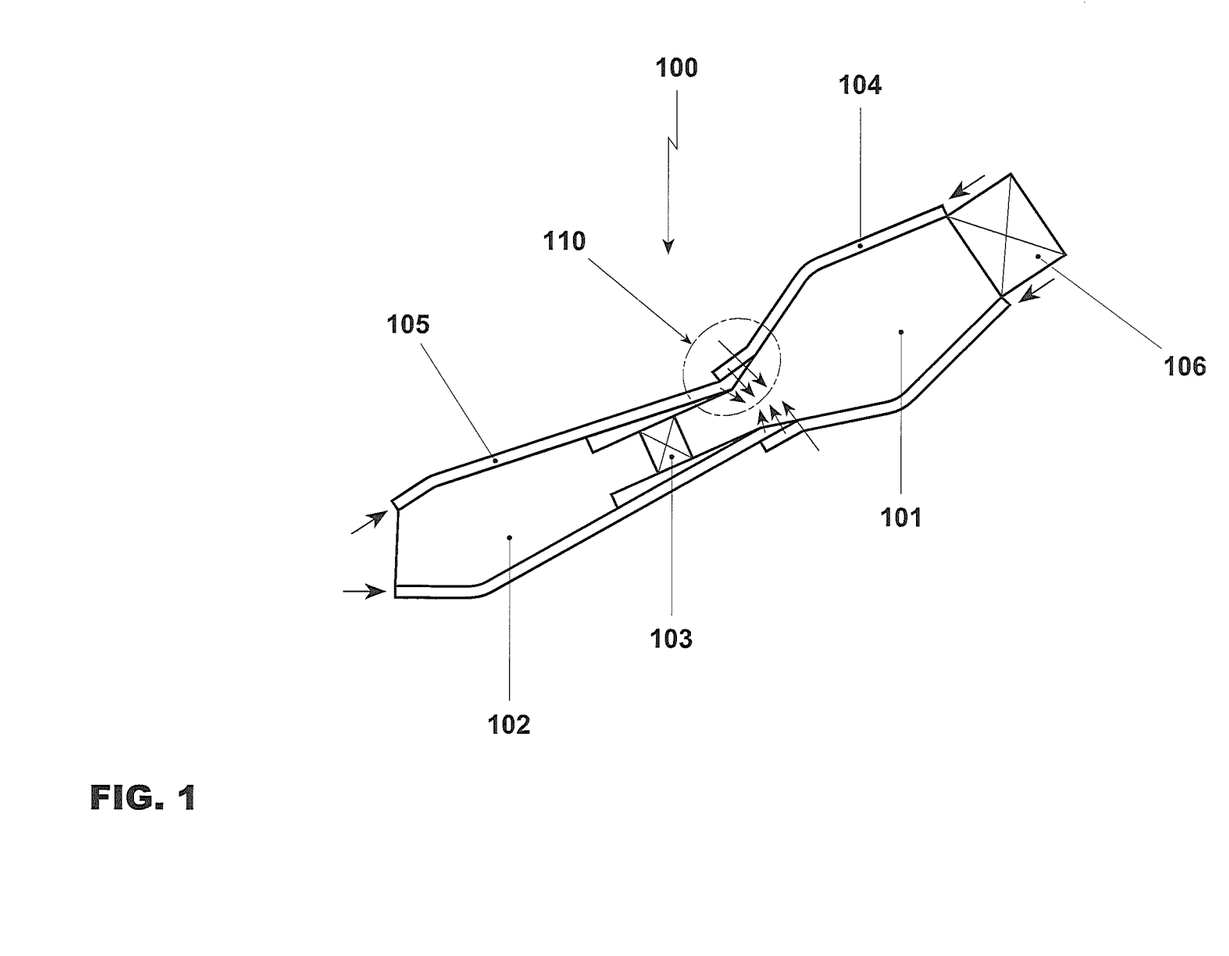
FIG. 1 shows a generic gas turbine using sequential combustion in a can-architecture.

FIG. 1 shows a gas turbine 100 with sequential combustion for implementing the method according to the invention. It comprises a compressor (not shown), a first can-combustor 101, a second can-combustor 102 with a reheat burner 103 and a turbine (not shown). Typically, it includes a generator (not shown), which at the cold end of the gas turbine, that is to say at the compressor, is coupled to a shaft of the gas turbine.

FIG. 1 shows a generic gas turbine 100 using sequential combustion in a can-architecture, thereby a dilution air mixer 110 of the dilution air is added.

Additionally, the gas turbine comprises a premix combustor liner 104 and a sequential combustor liner 105, wherein the air flow along the liners is directed to the intermediate placed dilution air mixer 110 between the first 101 and the second combustor 102. The exact placement of the dilution air mixer 110 is not to be understood strictly symmetrical and it depends on the particular design of the combustors.

Referring to other concept the gas turbine comprises a compressor, a first combustor, a first turbine, a second combustor and a second turbine. Typically, it includes a generator which at the cold end of the gas turbine that is to say at the compressor is coupled to a shaft of the gas turbine. The first combustor and the second combustor run in an annular concept or in a can-architecture, while the first turbine can be downstream of the first combustor.

The can architecture comprises a plurality of cans arranged in an annular array about the circumference of the turbine shaft, which enables an individual combustion operation of each can and which will be no harmful interactions among individual cans during the combustion process.

If premix burners 106 for the can's combustion or annular concept are provided, these should preferably be formed by the combustion process and objects according to the documents EP 0 321 809 A1 and/or EP 0 704 657 A2, wherein these documents forming integral parts of the present description.

In particular, said premix burners 106 can be operated with liquid and/or gaseous fuels of all kinds. Thus, it is readily possible to provide different fuels within the individual cans. This means also that a premix burner can also be operated simultaneously with different fuels.

The second or subsequent combustor can or annular combustor is preferably carried out by EP 0 620 362 A1 or DE 103 12 971 A1, wherein these documents forming integral parts of the present description.

Additionally, the following mentioned documents forming also integral parts of the present description:

EP 0 321 809 A1 and B1 relating to a burner consisting of hollow part-cone bodies making up a complete body, having tangential air inlet slots and feed channels for gaseous and liquid fuels, wherein in that the centre axes of the hollow part-cone bodies have a cone angle increasing in the direction of flow and run in the longitudinal direction at a mutual offset. A fuel nozzle, which fuel injection is located in the middle of the connecting line of the mutually offset centre axes of the part-cone bodies, is placed at the burner head in the conical interior formed by the part-cone bodies.

EP 0 704 657 A2 and B1, relating to a burner arrangement for a heat generator, substantially consisting of a swirl generator, substantially according to EP 0 321 809 A1 and B1, for a combustion air flow and means for injection of fuel, as well of a mixing path provided downstream of said swirl generator, wherein said mixing path comprises transaction ducts extending within a first part of the path in the flow direction for transfer of a flow formed in said swirl generator into the cross-section of flow of said mixing path, that joins downstream of said transition ducts.

Furthermore, it is proposed a fuel injector for use within a gas turbine reheat combustor, utilising auto-ignition of fuel, in order to improve the fuel air mixing for a given residence time. The specific embodiments of this injector are envisaged:

The gaseous fuel is injected normal to the flow of oxidant in sense of a cross-flow configuration.

The gaseous fuel is injected parallel to the flow of oxidant in sense of an in-line configuration.

The gaseous fuel is injected at an oblique angle, between 0° and 90° to the flow of oxidant.

EP 0 646 705 A1 and B1, relating to a method of establishing part load operation in a gas turbine group with a sequential combustion.

EP 0 646 704 A1 and B1, relating to a method for controlling a gas turbine plant equipped with two combustor chambers.

EP 0 718 470 A2 and B1, relating to method of operating a gas turbine group equipped with two combustor chambers, when providing a partial-load operation.

Other relevant published documents, which include one or more improvements of the above identified documents forming also integral parts of the present description.

FIG. 2 shows a dilution air mixing geometry in the sense of a dilution air mixer 110 having an outer wall 201, an inner wall 202 with respect to the premix liner cooling 204, an inner wall 203 with respect to the sequential liner cooling 205 and an intermediate separation 206 of the two air streams 204, 205 along the relative channels. Cooling air 205 from the reheat combustor (see FIG. 1) and any remaining air 204 from the premix combustor (see FIG. 1) are supplied to the dilution air mixer 110 separately and subsequently to the hot gas flow 209 from the premix burner (see FIG. 1).

FIG. 2*a* shows a graphical scheme of the operational elements with details of the pressures. In order to have sufficient backflow margin, both dilution air streams have to be injected with an excess pressure of about 1.5%. But in this constellation it is a fact that not all flow paths are at the same pressure level, due the different pressure drop characteristic of sequential and premix liner cooling (see FIG. 2, numerals 204, 205) as depicted in FIG. 2*a*.

This configuration leads at least 8% combustor pressure drop, as a result of aforementioned backflow margin requirement and differences among all three flow paths 210, 211, 212.

Accordingly, pressure drop or decrease must be artificially increased in premix liner 211 and premix burner circuit 212 in order to match the sequential liner cooling circuit 210.

Figures 3, 3A:
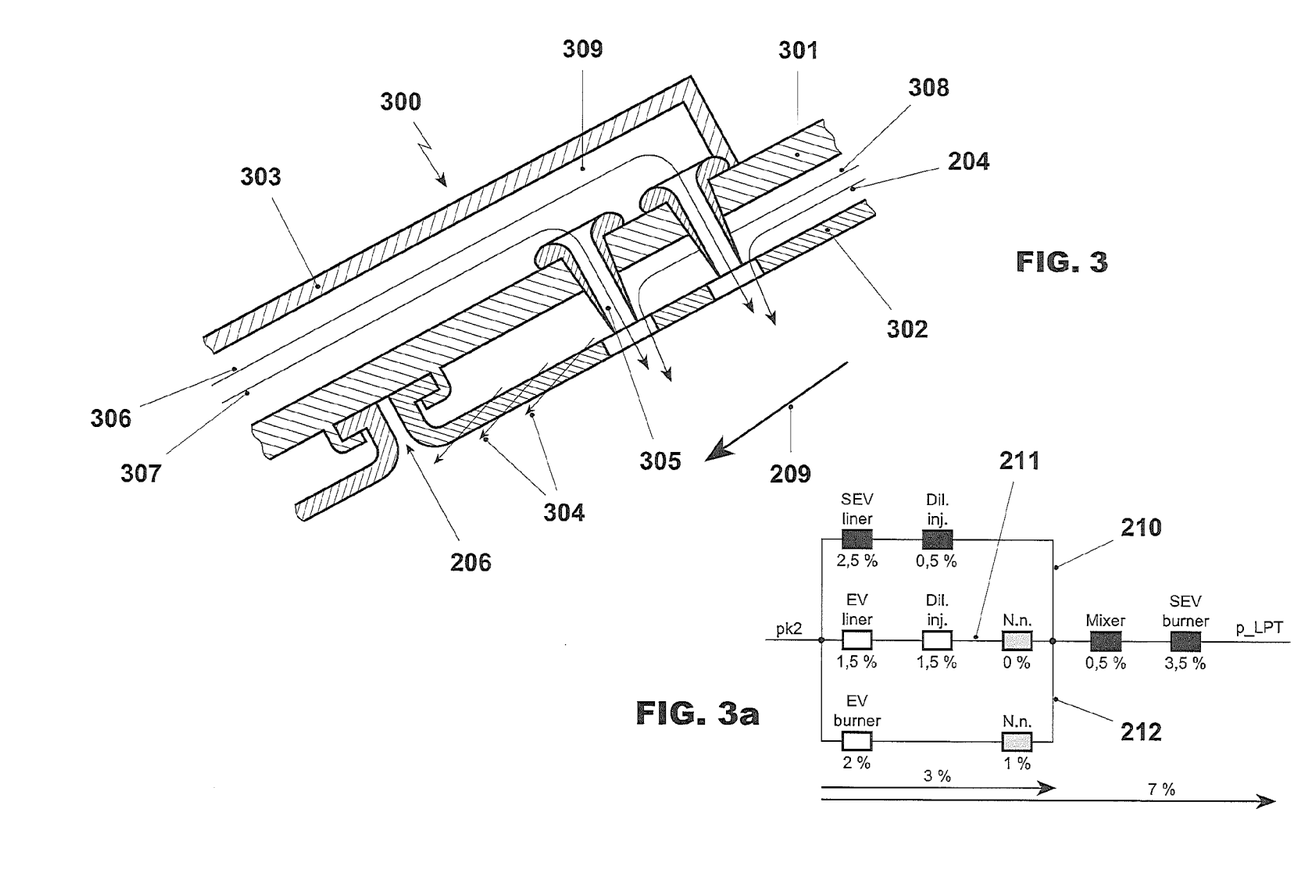
FIG. 3 shows a coaxial dilution air injection with reduced pressure drop.
FIG. 3a shows a graphical scheme of the operational elements with details of the pressure drops.

FIG. 3 shows a coaxial dilution air injection in the sense of a dilution air mixer 300 having an outer main wall 301, an inner wall 302 with respect to the premix liner cooling 204 and an intermediate closure 308 with respect to the premix liner cooling 204. A superimposed outer wall 303 forms a channel 309 for an air flow 306, 307 from the sequential liner cooling. This configuration is based on co-axial injection of premix liner cooling air 204 with sequential liner cooling air 306, 307. There could be multiple rows of holes 305 with identical, similar or different diameters in any configuration together, in order to achieve optimum mixing with respect to the hot gas from premix burner 209.

Additionally and in connection with an option, the dilution air mixer 300 is provided with apertures as sheet-forming bores 304 for the injection of a dispensable or excrescent air flow downstream of the multiple rows of holes 305 in the flow direction of the hot gas from premix burner 209 and in the peripheral direction.

FIG. 3*a* shows a graphical scheme of the operational elements with details of the pressures. With this way due the embodiment of FIG. 3 it is possible to have sufficient backflow margin even with sequential liner cooling air circuit 210 at 0.5% excess pressure, by virtue of the shielding effect of external higher pressure air from premix liner cooling circuit 211, 212.

Figure 4:
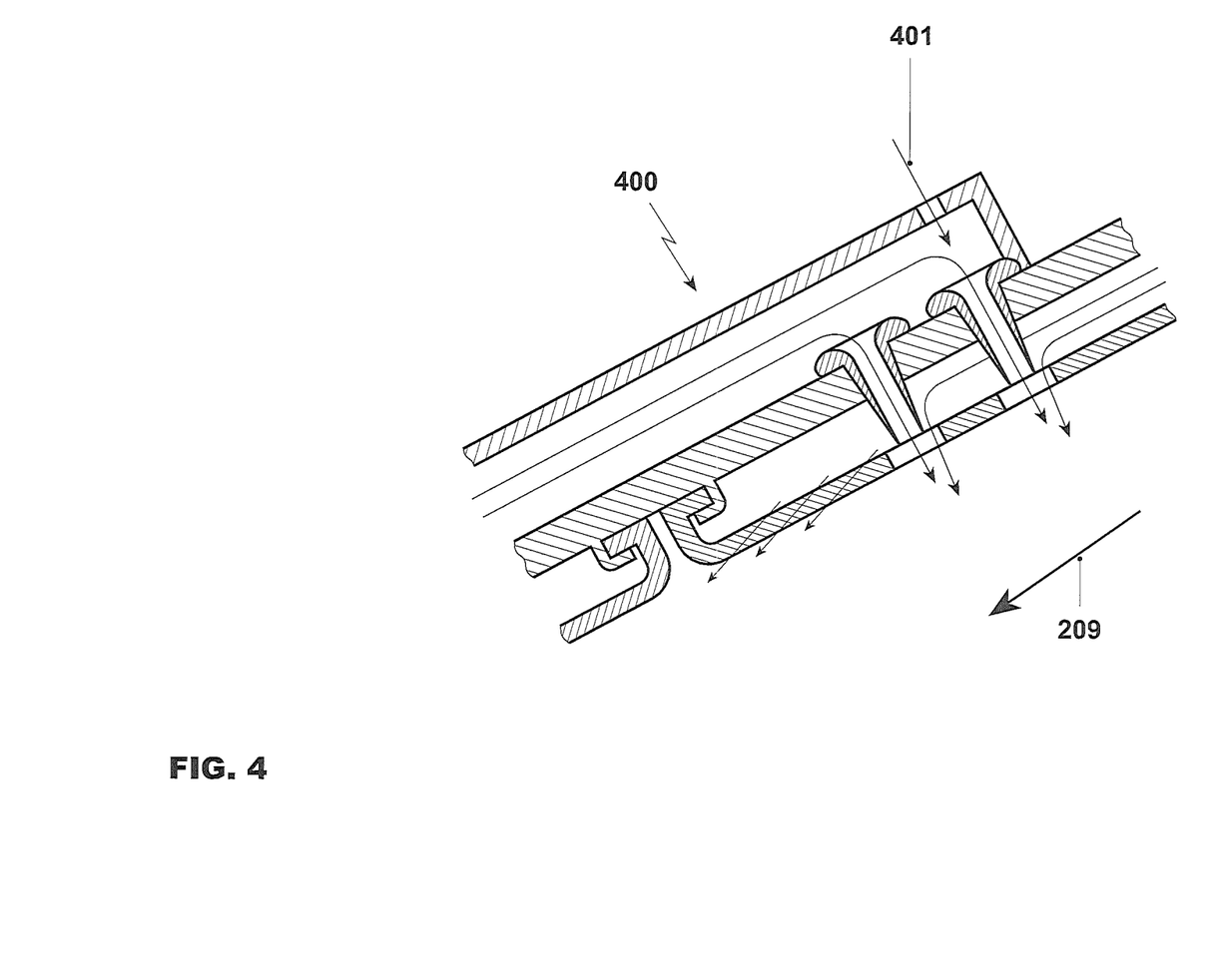
FIG. 4 shows a coaxial dilution air injection with multiple rows of holes and additional air from the plenum of the gas turbine.

The dilution air mixer 400 according to FIG. 4 is based on the dilution air mixer 300 according to FIG. 3 with an additional air flow 401 from plenum of the gas turbine. With this way it is possible to have sufficient backflow margin even with sequential liner cooling air circuit 210 (see FIG. 3) at less than 0.5% excess pressure.

Figures 5, 5A:
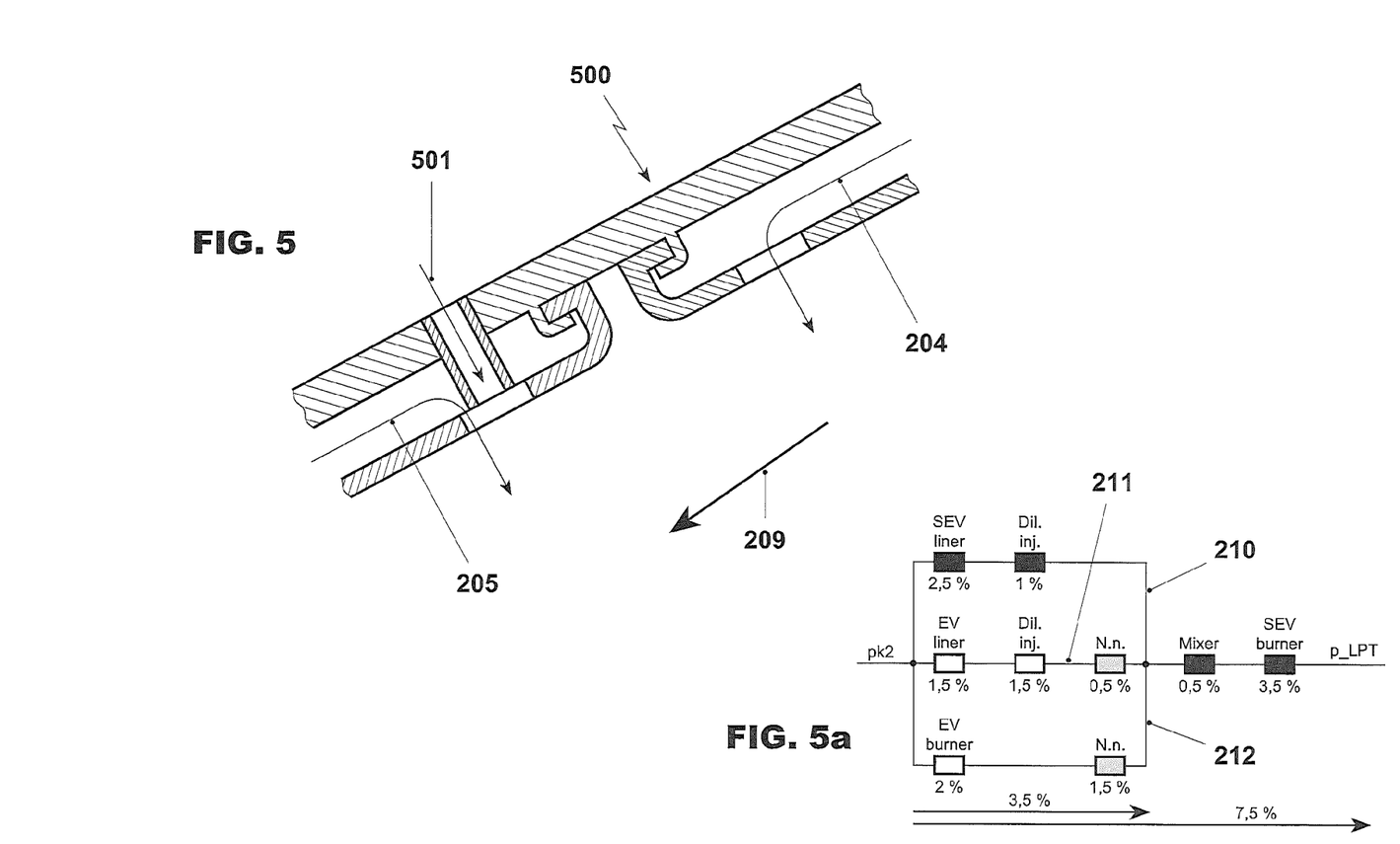
FIG. 5 shows a coaxial dilution air injection with additional air from the plenum supporting sequential liner air.
FIG. 5a shows a graphical scheme of the operational elements with details of the pressure drops.

The dilution air mixer 500 according to FIG. 5 is based on the dilution air mixer 110 according to FIG. 2 (see also FIG. 1, item 110) with an additional air flow 501 from plenum of the gas turbine supporting sequential liner air 205. With this way it is possible to have sufficient backflow margin even with sequential liner cooling air circuit 210 due FIG. 5*a* at 1% excess pressure.

Figure 6:
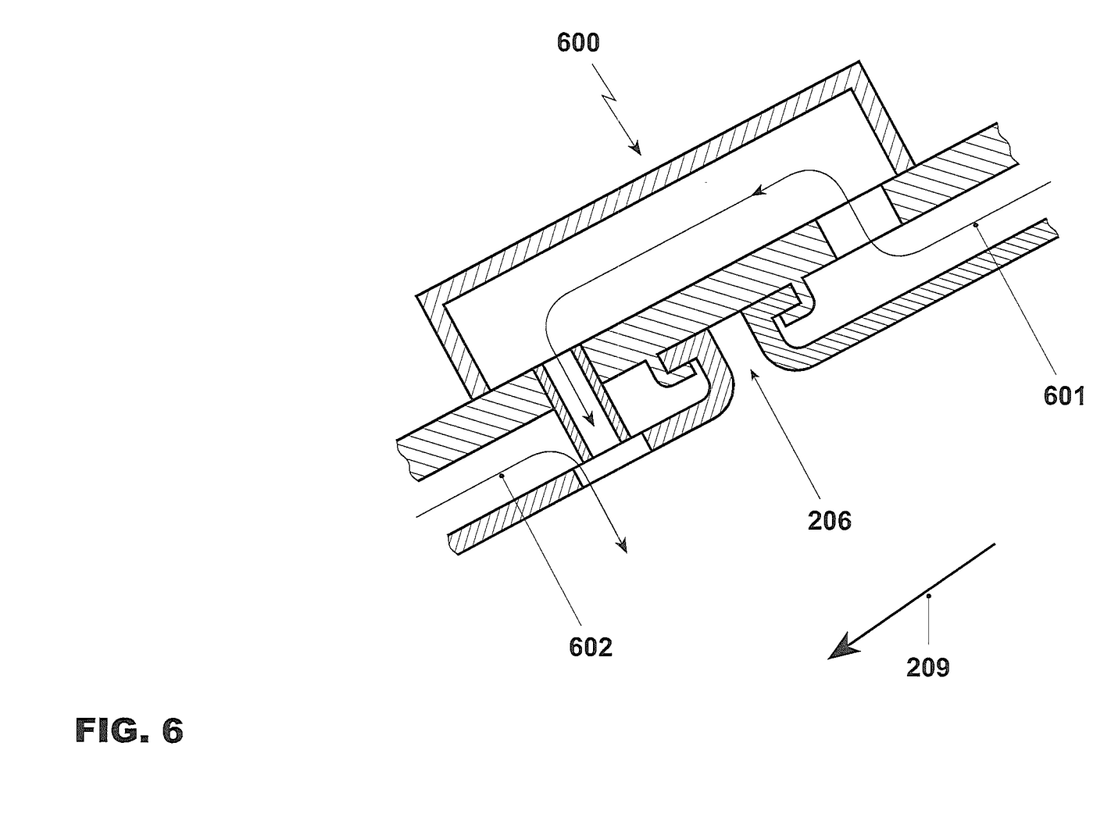
FIG. 6 shows a coaxial dilution air injection with premix liner cooling air supporting sequential liner air.

FIG. 6 shows a coaxial dilution air injection with premix liner cooling air 601 supporting directly sequential liner air 602 through a bypass of the intermediate separation 206. With this way it is possible to have sufficient backflow margin even with sequential liner cooling air circuit 210 (see FIG. 3*a*) at 1% excess pressure.

Figure 7:
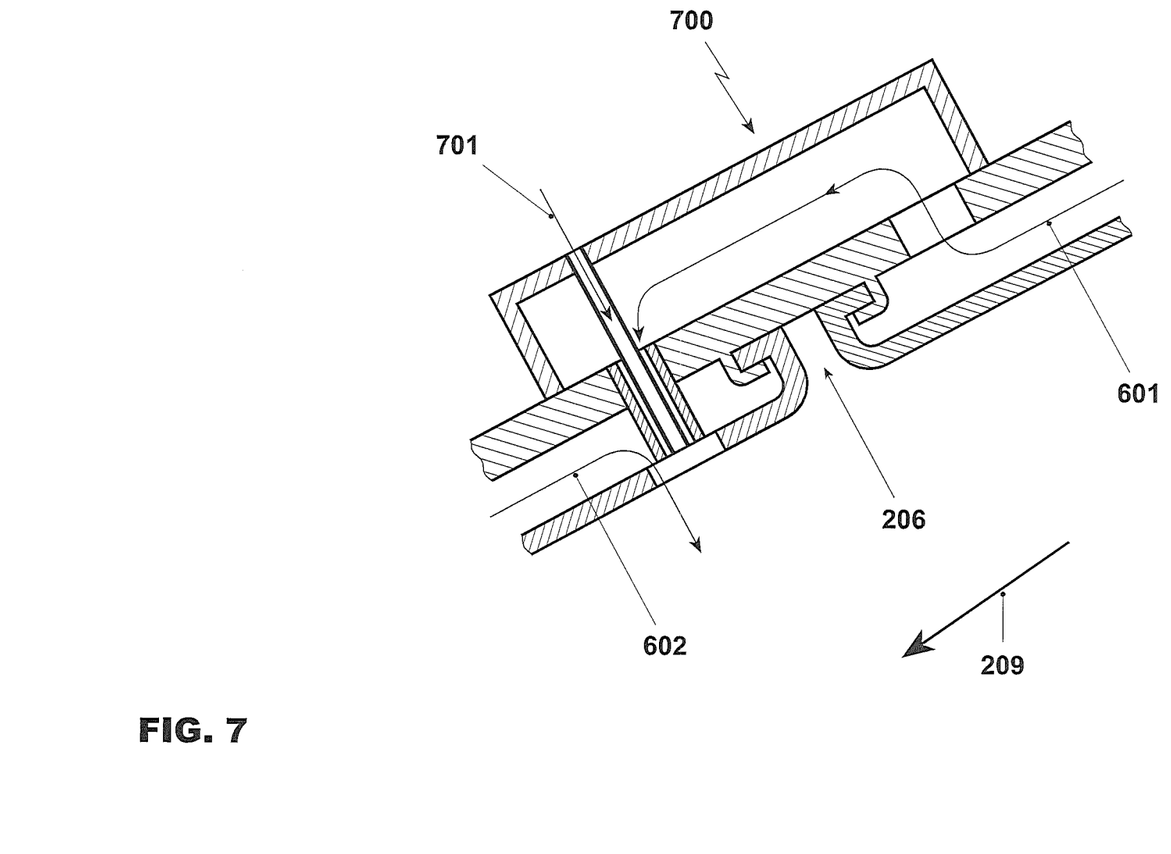
FIG. 7 shows a coaxial dilution injection premix liner cooling air and plenum air supporting sequential liner air.

FIG. 7 shows a coaxial dilution injection premix liner cooling air 601 and plenum air 701 supporting directly sequential liner cooling air 602 through a bypass of the intermediate separation 206. With this way it is possible to have sufficient backflow margin even with sequential liner cooling air circuit 210 (see FIG. 3a and FIG. 5a) at 1% excess pressure.

The invention claimed is:

1. A method for mixing a dilution air with a hot main flow in a sequential combustion system of a gas turbine, wherein the gas turbine comprises at least one compressor, a first combustor which is connected downstream to the compressor and at least one second combustor, hot gases of the first combustor are admitted to at least one intermediate turbine or to the at least one second combustor, wherein hot gases of the second combustor are admitted to a further turbine or directly or indirectly to an energy recovery device; the method comprising:
coaxial injecting radially said first combustor liner cooling air with a radial-coaxial said second combustor liner cooling air, the first combustor liner cooling air having an excess pressure margin with respect to the second combustor liner cooling air.

2. The method as claimed in claim 1, wherein the at least one second combustor runs under a caloric combustion path having a can-architecture.

3. The method as claimed in claim 1, wherein the first and second combustor run under a caloric combustion path having a can-architecture.

4. The method as claimed in claim 1, wherein the first combustor runs under a caloric combustion path having an annular architecture, and the second combustor runs under a caloric combustion path having a can-architecture.

5. The method as claimed in claim 1, wherein that the first combustor runs under a caloric combustion path having a can-architecture, and the second combustor runs under a caloric combustion path having an annular architecture.

6. The method as claimed in claim 1, wherein the first combustor runs under a caloric combustion path having an annular architecture.

7. The method as claimed in claim 6, wherein the second combustor also runs under a caloric combustion path having an annular architecture.

8. The method as claimed in claim 1, wherein the coaxial injecting of the first combustor liner cooling air with second combustor liner cooling air is based on additional air from a plenum of the gas turbine supporting second combustor liner cooling air.

9. A method as claimed in claim 1, wherein the first combustor operates as a premix combustion area and the second combustor operates as a sequential combustion area or as a reheat area.

10. The method of claim 1, wherein the excess pressure margin is less than 0.5%.

11. The method of claim 1, wherein the excess pressure margin is 1.0%.

12. The method of claim 1, wherein the excess pressure margin is 0.5%.

* * * * *